United States Patent [19]

Schneeweiss et al.

[11] 4,324,416
[45] Apr. 13, 1982

[54] WHEEL SUSPENSION FOR MOTOR VEHICLES

[75] Inventors: Manfred Schneeweiss, Wettstetten; Adolf Götzenberger; Aloys Ohm, both of Ingolstadt, all of Fed. Rep. of Germany

[73] Assignee: Audi NSU Auto Union Aktiengesellschaft, Ingolstadt, Fed. Rep. of Germany

[21] Appl. No.: 134,496

[22] Filed: Mar. 27, 1980

[30] Foreign Application Priority Data

Mar. 29, 1979 [DE] Fed. Rep. of Germany ..... 29127875

[51] Int. Cl.³ .............................................. B62D 17/00
[52] U.S. Cl. .................................................. 280/661
[58] Field of Search ................. 280/661, 96.1, 95 R, 280/668

[56] References Cited

U.S. PATENT DOCUMENTS

| | | | |
|---|---|---|---|
| 2,923,555 | 2/1960 | Kost et al. | 280/661 |
| 3,124,370 | 3/1964 | Trangott | 2880/661 |
| 4,026,578 | 5/1977 | Mattson | 280/661 |
| 4,213,631 | 7/1980 | Wilkerson | 280/661 |

FOREIGN PATENT DOCUMENTS 2303102  11/1976  Fed. Rep. of Germany .

Primary Examiner—Robert R. Song
Attorney, Agent, or Firm—Ward, Lalos, Leeds, Keegan & Lett

[57] ABSTRACT

A wheel suspension for a motor vehicle generally consisting of a wheel carrier, upper means for operatively connecting the wheel carrier to the body of the vehicle, and lower means for operatively connecting the wheel carrier to the vehicle body, the upper and lower connecting means providing upper and lower pivot joints defining a steering axis about which the wheel carrier is pivotal, the steering axis being disposed at an angle to the vertical providing a predetermined camber and caster, at least one component of one of the connecting means being disposable in at least first and second positions to alter the angle of the steering axis relative to the vertical and, correspondingly, the camber and/or caster.

5 Claims, 6 Drawing Figures

WHEEL SUSPENSION FOR MOTOR VEHICLES

This invention relates to a wheel suspension for motor vehicles and more particularly to a steering wheel suspension having improved means for setting the camber and caster of the wheel.

In the design of steering wheel suspensions, different settings of camber and caster are provided for basically the same wheel suspension configurations, depending upon the optional equipment installed on the vehicle or the desired driving performance of the vehicle, i.e., either for riding comfort or maneuverability as is desired in sport vehicles. As an example, when a vehicle is equipped with simple mechanical steering, it is desirable to provide a slight amount of caster to the steering wheels so as to minimize steering forces. On the other hand, when a vehicle is equipped with power-assisted steering, it is more advantageous to provide a generous amount of caster for the purpose of stabilizing the performance of the vehicle. If a vehicle is designed principally for riding comfort and economy, a camber of approximately zero to a low positive value is advantageous. If the vehicle is designed principally for sporting purposes, a negative camber is desirable to improve steering performance.

In the prior art, it has been a conventional practice to provide wheel guide components having means for manually adjusting the camber and/or caster of the wheels. Such types of arrangements, however, do not provide for precise, positive settings. Furthermore, such arrangements require skilled personnel for making the manual adjustments which increases the cost of vehicle production. Another practice followed in the prior art for adjusting caster or camber has been to provide different sets of wheel suspension components for different camber and/or caster settings. Such practice, however, is undesirable in that it requires a large inventory of parts to accommodate the various number of desired settings. Furthermore, if the wheel guide components are redesigned to provide a different caster, as a general rule, the wheel carrier or a component interconnecting the wheel carrier to the wheel guide components must be redesigned so that such change in caster will not result in a change in the wheel base of the vehicle. It thus has been found to be desirable to provide a steering wheel suspension for motor vehicles in which the camber and/or caster can be altered which requires neither skilled personnel for making manual adjustments to the components or a large inventory of parts corresponding to different camber and/or caster settings.

Accordingly, it is the principal object of the present invention to provide an improved wheel suspension for motor vehicles.

Another object of the present invention is to provide a steering wheel suspension for motor vehicles having improved means for altering the camber and/or caster of the wheels thereof.

A further object of the present invention is to provide a front wheel suspension for motor vehicles in which the camber and/or caster can be set to accommodate either simple mechanical steering or power-assisted steering.

Another object of the present invention is to provide a front wheel suspension for a motor vehicle in which the camber and/or caster can be set to provide either greater driving comfort and economy of operation or improved steerability.

A further object of the present invention is to provide a front wheel suspension having improved means for altering the camber and/or caster of the wheels which requires neither skilled personnel for manually adjusting the camber and/or caster or a large inventory of parts corresponding to different camber and/or caster settings.

Other objects and advantages of the present invention will become more apparent to those persons having ordinary skill in the art to which the present invention pertains from the following description taken in conjunction with the accompanying drawings wherein.

Figure 1:
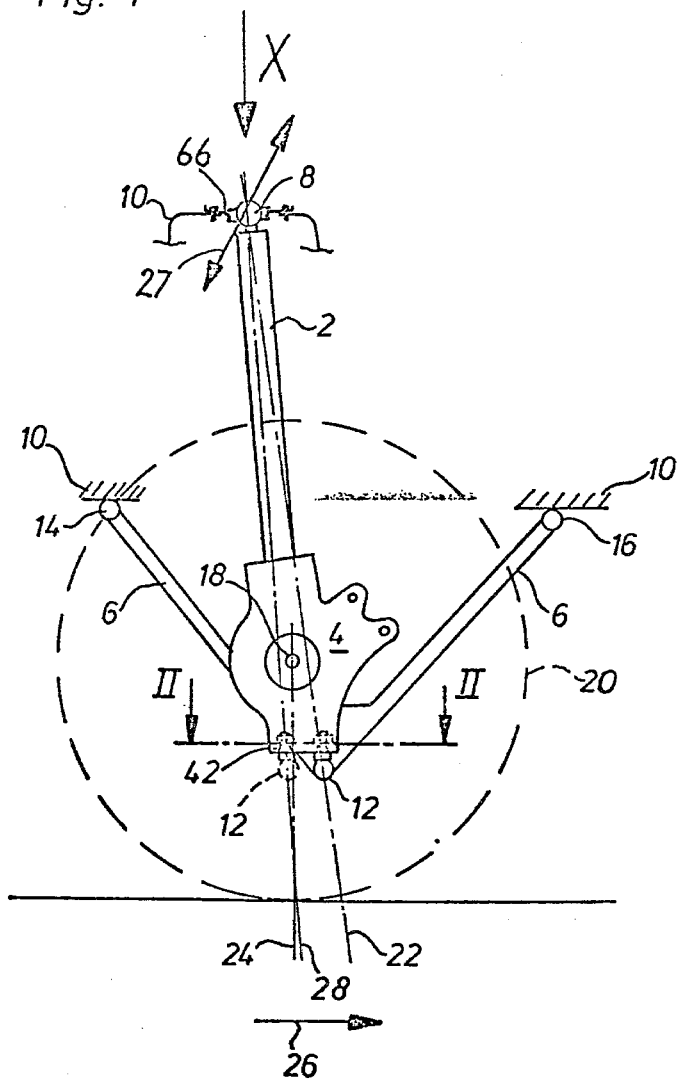
FIG. 1 is a diagrammatic, side elevational view of a wheel suspension embodying the present inventions.

Referring to FIG. 1, there is illustrated a front wheel suspension of a motor vehicle generally including a telescopic shock absorber 2, a wheel carrier 4 and a lower control arm or wishbone member 6. The lower end of shock absorber 2 is rigidly secured to wheel carrier 4. At the upper end thereof, the shock absorber is pivotally connected to the vehicle body 10 by means of a ball-and-socket type connection 8. Wheel carrier 4 is connected to lower control arm member 6 by means of a ball-and-socket type of connection 12, the lower control arm member being pivotally connected to the vehicle body by means of hinged connections 14 and 16 in such a manner so as to permit the control arm member to pivot about a longitudinal axis of the vehicle. An axle shaft 18 is journaled in wheel carrier 4, on which there is mounted a wheel 20 shown in broken lines. The wheel is mounted on the axle shaft in the conventional manner and may be driven by drive components connected to the axle shaft. Wheel carrier 4 is pivotal about a steering axis 22 defined by a line intersecting pivot joints 8 and 12, the angle of steering axis 22 relative to a vertical line 24 extending through the center of the wheel, in a vertical, longitudinal plane, defining the caster of wheel 18. It will be appreciated that if the point of intersection of steering axis 22 with the road surface lies ahead of vertical line 24, there is provided a positive caster of the wheel. Otherwise, the wheel will have a negative caster.

The camber of the wheel is defined by the angle of steering axis 22 relative to vertical line 24 in a transverse plane when the wheels are oriented longitudinally. The camber may be altered by transversely displacing pivot joint 8 relative to the vehicle frame as illustrated by the arrow 27.

Figure 2:
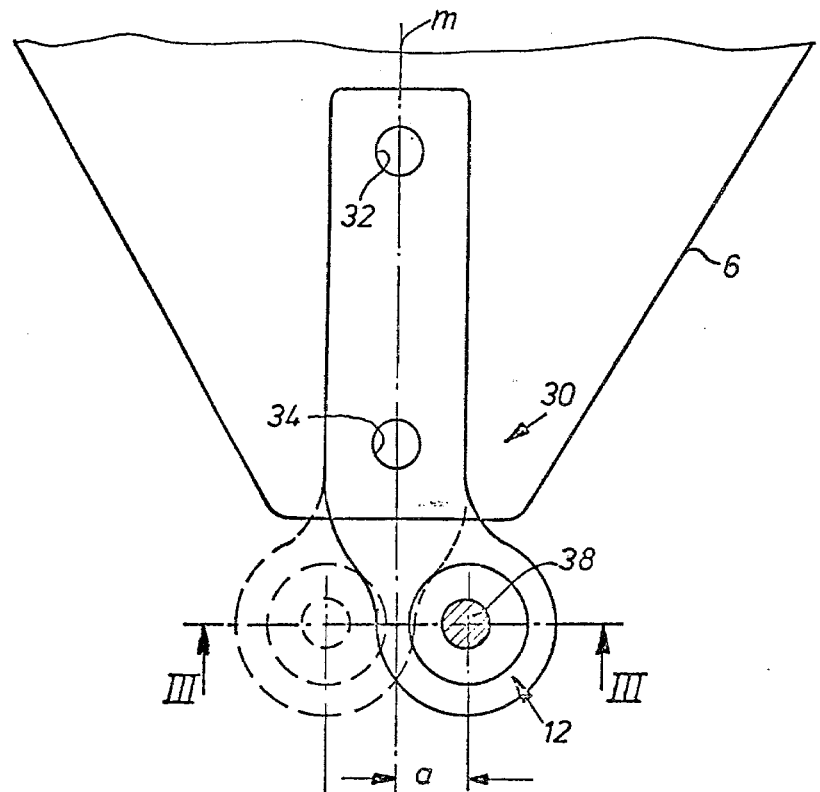
FIG. 2 is an enlarged, cross-sectional view taken along line II—II in FIG. 1, illustrating a mounting arm member mounted on a lower control arm, which is pivotally connected to a wheel carrier.
Figure 3:
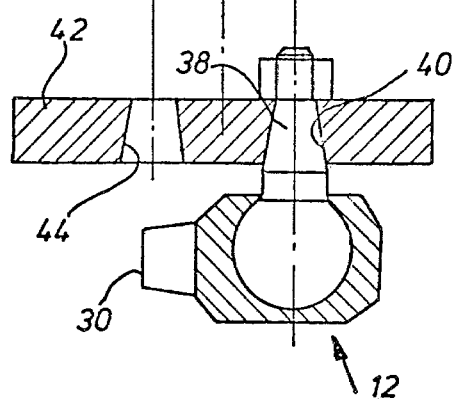
FIG. 3 is a cross-sectional view taken along line III—III in FIG. 2.

In accordance with the invention, the suspension is designed so that pivot joint 12 may be displaced from the position shown in solid lines in FIGS. 1 and 2 to the position shown in broken lines therein, thereby displacing the steering axis of the wheel from the position identified by reference numeral 22 to the position identified by reference numeral 28 and correspondingly resetting the caster of the wheel. As best shown in FIGS. 2 and 3, pivot point 12 is connected to a mounting arm member 30 which is detachably mounted on the outer end of lower control arm 6 by means of bolts inserted through mounting openings 32 and 34 located on a mounting axis m. Pivot joint 12 is mounted on an outer end of mounting arm 30 which projects laterally of the lower control arm and is offset laterally so that the pivot joint is displaced a distance a relative to mounting axis m.

Assuming that FIG. 2 illustrates the components of the left wheel suspension of the vehicle relative to the direction of motion of the vehicle, if mounting arm 30 is mounted on the identical right lower control arm (not shown) of the vehicle and the mounting arm, which is identical, is reversed to the left, it will assume the position shown by the broken lines, i.e., the pivot point of pivot joint 12 will be displaced toward the front of the vehicle by twice the distance a.

The pin 38 of ball joint 12 is mounted in a conical hole 40 of a mounting flange 42 formed on wheel carrier 4 and is secured therein by means of a threaded fastener. To prevent a change in the wheel base of the vehicle, when the ball joint 12 is displaced, there is provided in flange 42 a second mounting hole 44 spaced at a distance equal to twice the distance a from hole 40, in which pin 38 may be mounted.

Figure 4:
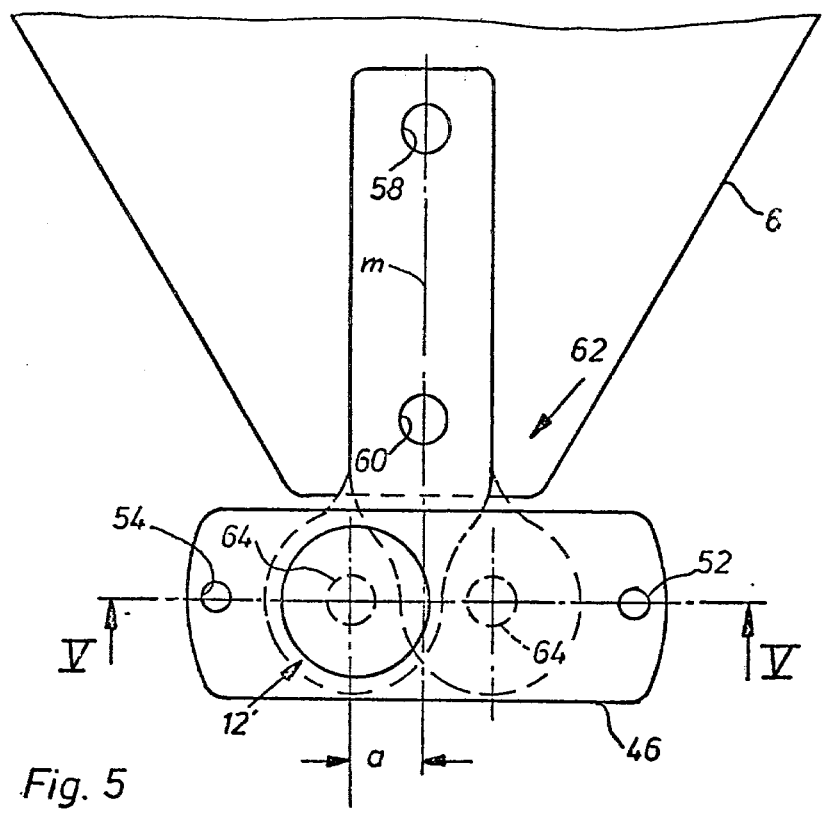
FIG. 4 is a view similar to the view shown in FIG. 3, illustrating a modification of the embodiment shown in FIG. 3.
Figure 5:
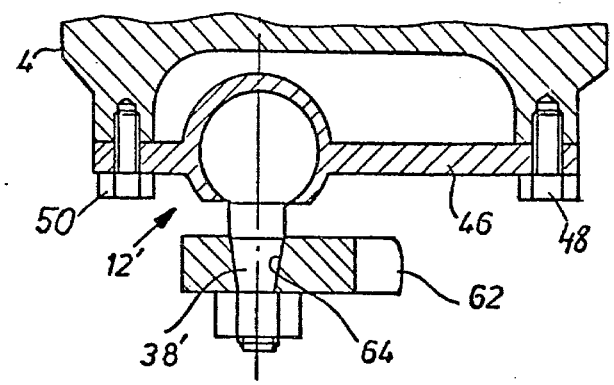
FIG. 5 is a cross-sectional view taken along line V—V in FIG. 4.

FIGS. 4 and 5 illustrate a modification of the embodiment shown in FIGS. 2 and 3 in which the pivot joint 12′ is mounted on an intermediate flange 46, displaced from a transverse centerline thereof. Intermediate flange 46 is secured to wheel carrier 4 by means of a set of bolts 48 and 50 which extend through openings 52 and 54 in intermediate flange 46 and are threaded into the wheel carrier. As best shown in FIG. 4, bolt holes 52 and 54 are spaced equally from transverse centerline m and the axis of ball joint 12 is spaced from the transverse centerline, along a line intersecting the axes of bolt holes 52 and 53, a distance a. Thus, by rotating intermediate flange 46, 180°, the pivot point of the ball joint will be displaced by twice the distance a relative to wheel carrier 4 so that a change in the wheel base will be avoided.

Mounting arm 62, which is detachably mounted on lower control arm 6 by means of bolts inserted in bolt holes 58 and 60 lying along mounting axis m, in the same manner as described in connection with the embodiment shown in FIG. 2, is provided with a mounting hole 64 for ball pin 38′. As best shown in FIG. 4, mounting hole 64 also is displaced relative to mounting axis m. The caster can further be adjusted by mounting the mounting arm 62 in the right control arm and vice versa.

Figure 6:
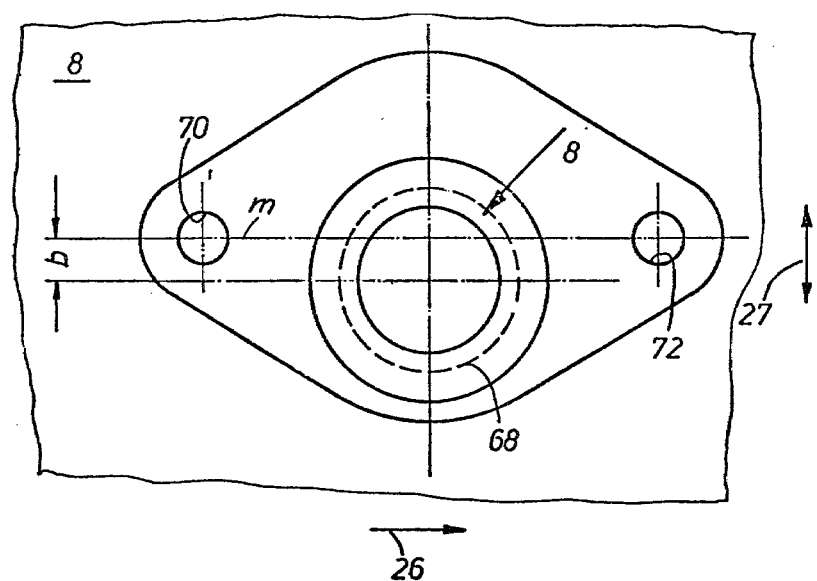
FIG. 6 is an enlarged view taken in the direction of the arrow x in FIG. 1.

Referring to FIGS. 1 and 6, it will be seen that upper joint 8 is connected to a bracket 66 detachably connected to the vehicle body. To dampen vibrations, a ring-shaped rubber element 68 is inserted between the ball portion of joint 8 and bracket 66. The bracket is provided with a pair of longitudinally aligned mounting holes 70 and 72 through which bolts are inserted and threaded into the vehicle body for detachably securing the bracket to the vehicle body. The axis of the socket in bracket 66 in which the ball portion of joint 8 is mounted is displaced laterally relative to the longitudinal line intersecting the axes of mounting holes 70 and 72, by a distance b as best shown in FIG. 6. It will be appreciated that by detaching bracket 66 from the vehicle body, rotating it 180° and bolting the bracket to the vehicle body, the pivot point of joint 8 will be displaced transversely by twice the distance b. As the pivot point of joint 8 is thus displaced laterally, the camber of the wheel mounted on the suspension correspondingly will be altered. From a design point of view, the value of dimension b must be such that each mounting position of the bracket will provide the desired positive or negative camber.

Although the invention has been described in terms of displacing the lower ball joint 12 longitudinally to adjust for caster, and displacing the upper joint 8 transversely to adjust for camber, it will be appreciated that opposite arrangements will provide similar results, i.e., lower ball joint 12 may be displaced transversely to adjust camber and upper joint 8 may be displaced longitudinally to adjust caster. Ball joint 12 or mounting hole 64 for joint pin 38 similarly may be provided directly on the lower control arm member. Under such circumstances, the configurations of the left and right control arms must be symmetrical so that when the control arms are reversed, no undesirable changes will occur with respect to axial geometry. Furthermore, to avoid mistakes during the installation of the suspension or the adjustment of the wheel guide elements, such components may be provided with appropriate markings.

From the foregoing detailed description, it will be evident that there are a number of changes, adaptations and modifications of the present invention which come within the province of those persons having ordinary skill in the art to which the aforementioned invention pertains. However, it is intended that all such variations not departing from the spirit of the invention be considered as within the scope thereof as limited solely by the appended claims.

We claim:

1. A wheel suspension for a motor vehicle comprising a wheel carrier, upper means for operatively connecting said wheel carrier to the body of said vehicle and lower means for operatively connecting said wheel carrier to said vehicle body, said upper and lower connecting means providing upper and lower pivot joints defining a steering axis about which said wheel carrier is pivotal, said steering axis being disposed at an angle to the vertical providing a predetermined caster, one component of said lower connecting means being disposable in at least a first or a second position to alter the angle of said steering axis relative to the vertical and correspondingly, said caster, said lower pivot joint being disposable at predetermined distances from a reference line on said lower connecting means, and a mounting flange mounted on said wheel carrier, said mounting flange being mountable in a first position and mountable in a second position displaced 180° relative to a centerline thereof, said lower pivot joint being disposed on said mounting flange at a point displaced from the center line of said mounting flange a distance equal to the displacement of said lower pivot joint relative to the reference line on said lower connecting means.

2. A wheel suspension for a motor vehicle comprising a wheel carrier, upper means for operatively connecting said wheel carrier to the body of said vehicle and lower means for operatively connecting said wheel carrier to said vehicle body, said upper and lower connecting means providing upper and lower pivots joints defining a steering axis about which said wheel carrier is pivotal, said steering axis being disposed at an angle to the vertical providing a predetermined caster, one component of said lower connecting means being disposable in at least a first or a second position to alter the angle of said steering axis relative to the vertical and, correspondingly, said caster, said lower pivot joint being disposable at predetermined distances from a reference line on said lower connecting means and said lower pivot joint being disposable at points on said wheel carrier spaced apart a distance equal to twice said predetermined distances.

3. A wheel suspension according to claim 1 or 2 wherein said lower connecting means includes a lower control arm pivotally connected to said vehicle body, said component includes a mounting arm detachably mounted on said lower control arm along a mounting axis, said lower pivot joint is displaced relative to said mounting axis and said mounting arm may be mounted in said first position to provide a first caster and may be rotated 180° relative to said mounting axis to said second position to provide a second caster.

4. A wheel suspension according to claim 1, 2 or 3 wherein said lower pivot joint comprises a ball and joint-type connection including a component thereof disposed on said component of said lower connecting means at a point displaced relative to a mounting axis thereof, and a cooperating component disposed on said wheel carrier.

5. A wheel suspension according to claim 1 or 2 wherein said lower connecting means comprises a lower control arm provided with spaced means for pivotally connecting said control arm to said vehicle body, said control arm connecting means is disposed symmetrically relative to a centerline thereof, whereby said control arm may be mounted on either side of said vehicle, and said lower joint is mounted on said control arm, displaced relative to said centerline.

* * * * *